United States Patent
Konopka et al.

(10) Patent No.: US 8,880,675 B2
(45) Date of Patent: *Nov. 4, 2014

(54) METHOD AND APPARTUS FOR USE IN REMOTE DIAGNOSTICS

(71) Applicants: Sony Corporation, Tokyo (JP); Sony Electronics Inc., Park Ridge, NJ (US)

(72) Inventors: Courtney Konopka, Carlsbad, CA (US); Masahiko Seki, Chiba (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,914

(22) Filed: Aug. 28, 2013

(65) Prior Publication Data

US 2013/0346586 A1 Dec. 26, 2013

Related U.S. Application Data

(63) Continuation of application No. 13/171,308, filed on Jun. 28, 2011, now Pat. No. 8,635,325, which is a continuation of application No. 11/935,218, filed on Nov. 5, 2007, now Pat. No. 7,984,121, which is a continuation of application No. 10/678,046, filed on Oct. 1, 2003, now Pat. No. 7,308,492.

(60) Provisional application No. 60/415,863, filed on Oct. 2, 2002.

(51) Int. Cl.

| G06F 15/173 | (2006.01) |
|---|---|
| H04L 12/26 | (2006.01) |
| H04L 29/06 | (2006.01) |
| H04L 29/08 | (2006.01) |
| H04L 12/28 | (2006.01) |

(52) U.S. Cl.
CPC .............. *H04L 43/00* (2013.01); *H04L 69/329* (2013.01); *H04L 2012/2849* (2013.01); *H04L 12/2814* (2013.01); *H04L 2012/2845* (2013.01); *H03L 67/12* (2013.01); *H04L 12/2825* (2013.01); *H04L 2012/2841* (2013.01); *H04L 29/06* (2013.01); *H04L 63/0428* (2013.01); *H04L 12/2803* (2013.01)
USPC .......... 709/223; 709/224; 714/38.14; 717/173

(58) Field of Classification Search
USPC ................ 709/223, 224; 714/38.15; 717/173
See application file for complete search history.

(56) References Cited

U.S. PATENT DOCUMENTS

| 5,704,031 A | 12/1997 | Mikami et al. |
| 5,745,675 A | 4/1998 | Herbig et al. |

(Continued)

OTHER PUBLICATIONS

Muller, Nathan J.; "Web-Accessible Network Management Tools"; International Journal of Network Management; 1997; vol. 7, pp. 288-297.

(Continued)

*Primary Examiner* — Thomas Dailey
(74) *Attorney, Agent, or Firm* — Fitch, Even, Tabin & Flannery LLP

(57) ABSTRACT

The present invention provides an apparatus, system and method for use in remotely diagnosing electronic devices and/or providing content. The method for use in remotely diagnosing includes the initiating a diagnostic analysis of an electronic device, identifying the electronic device, receiving scripts communicated over a distributed network for diagnosing, remotely initiating diagnostic instructions with the scripts and receiving a response based on the instruction. The method can further determine further diagnostic instructions based on responses, and remotely initiate further instructions with the scripts. Additionally, a system for use in remotely diagnosing electronic devices includes a script generator coupled with a distributed network, and a remote diagnostic controller coupled with the distributed network and with an electronic device. The script generator compiles scripts and forwards them over the distributed network. The diagnostic controller implements the scripts to forward instructions to and to receive replies from the electronic device.

7 Claims, 8 Drawing Sheets

(56) References Cited

U.S. PATENT DOCUMENTS

| | | |
|---|---|---|
| 5,835,911 A | 11/1998 | Nakagawa et al. |
| 5,903,626 A | 5/1999 | Iglehart et al. |
| 5,964,891 A | 10/1999 | Caswell et al. |
| 5,987,514 A | 11/1999 | Rangarajan |
| 6,052,750 A | 4/2000 | Lea |
| 6,074,434 A | 6/2000 | Cole et al. |
| 6,151,709 A | 11/2000 | Winkel |
| 6,161,132 A | 12/2000 | Roberts et al. |
| 6,167,567 A | 12/2000 | Chiles et al. |
| 6,170,065 B1 | 1/2001 | Kobata et al. |
| 6,178,452 B1 | 1/2001 | Miyamoto |
| 6,181,326 B1 | 1/2001 | Takahashi |
| 6,188,400 B1 | 2/2001 | House et al. |
| 6,205,579 B1 | 3/2001 | Southgate |
| 6,212,564 B1 | 4/2001 | Harter et al. |
| 6,266,774 B1 | 7/2001 | Sampath et al. |
| 6,301,661 B1 | 10/2001 | Shambroom |
| 6,301,707 B1 | 10/2001 | Carroll et al. |
| 6,321,348 B1 | 11/2001 | Kobata |
| 6,397,245 B1 * | 5/2002 | Johnson et al. ............... 709/203 |
| 6,445,907 B1 | 9/2002 | Middeke et al. |
| 6,473,788 B1 | 10/2002 | Kim et al. |
| 6,671,812 B1 | 12/2003 | Balasubramaniam et al. |
| 6,697,969 B1 | 2/2004 | Merriam |
| 6,701,441 B1 * | 3/2004 | Balasubramaniam et al. . 726/25 |
| 6,757,837 B1 | 6/2004 | Platt et al. |
| 6,785,834 B2 | 8/2004 | Chefalas et al. |
| 6,789,215 B1 | 9/2004 | Rupp et al. |
| 6,826,512 B2 | 11/2004 | Dara-Abrams et al. |
| 6,857,013 B2 | 2/2005 | Ramberg et al. |
| 6,865,691 B1 | 3/2005 | Brundridge et al. |
| 6,880,083 B1 | 4/2005 | Korn |
| 6,883,118 B2 | 4/2005 | Morgan et al. |
| 6,999,912 B2 | 2/2006 | Loisey et al. |
| 7,020,598 B1 | 3/2006 | Jacobson |
| 7,281,047 B2 | 10/2007 | Hayko et al. |
| 7,308,492 B2 | 12/2007 | Konopka et al. |
| 7,389,219 B2 | 6/2008 | Loisey et al. |
| 7,984,121 B2 | 7/2011 | Konopka et al. |
| 2001/0011375 A1 | 8/2001 | Yun |
| 2002/0040389 A1 | 4/2002 | Gerba et al. |
| 2002/0165952 A1 | 11/2002 | Sewell et al. |
| 2002/0188853 A1 | 12/2002 | Owhadi |
| 2003/0198188 A1 | 10/2003 | Castlebury et al. |
| 2004/0064518 A1 | 4/2004 | Almstrand et al. |
| 2004/0070600 A1 | 4/2004 | Morrisroe et al. |
| 2004/0073654 A1 | 4/2004 | Sarma |
| 2004/0236843 A1 * | 11/2004 | Wing et al. ................... 709/219 |

OTHER PUBLICATIONS

Jenkins, Ron; "Why Web-Based Network Monitoring? Leveraging the Platform"; International Journal of Network Management; 1999; vol. 9, pp. 175-183.

Malkhi et al.; "Secure Execution of Java Applets Using a Remote Playground"; IEEE Transactions on Software Engineering; Dec. 12, 2000; vol. 26, pp. 1197-1209.

USPTO; Non-Final Office Action issued in U.S. Appl. No. 10/678,046; Mailed Apr. 11, 2005; 19 Pages.; FETF.

USPTO; Non-Final Office Action issued in U.S. Appl. No. 10/678,046; Mailed Sep. 14, 2005; 14 Pages; FETF.

USPTO; Final Office Action issued in U.S. Appl. No. 10/678,046; Mailed Feb. 21, 2006; 17 Pages; FETF.

USPTO; Advisory Action issued in U.S. Appl. No. 10/678,046; Mailed May 12, 2006; 3 Pages; FETF.

USPTO; Non-Final Office Action issued in U.S. Appl. No. 10/678,046; Mailed Aug. 7, 2006; 12 Pages; FETF.

USPTO; Non-Final Office Action issued in U.S. Appl. No. 10/678,046; Mailed Jan. 25, 2007; 10 Pages; FETF.

USPTO; Notice of Allowance issued in U.S. Appl. No. 10/678,046; Mailed Jul. 30, 2007; 10 Pages; FETF.

USPTO; Non-Final Office Action issued in U.S. Appl. No. 11/935,218; Mailed Apr. 8, 2009; 16 Pages; FETF.

USPTO; Final Office Action issued in U.S. Appl. No. 11/935,218; Mailed Sep. 25, 2009; 15 Pages; FETF.

USPTO; Final Office Action issued in U.S. Appl. No. 11/935,218; Mailed Dec. 16, 2009; 16 Pages; FETF.

USPTO; Non-Final Office Action issued in U.S. Appl. No. 11/935,218; Mailed Mar. 18, 2010; 16 Pages; FETF.

USPTO; Non-Final Office Action issued in U.S. Appl. No. 11/935,218; Mailed Aug. 31, 2010; 5 Pages; FETF.

USPTO; Notice of Allowance issued in U.S. Appl. No. 11/935,218; Mailed Mar. 17, 2011; 10 Pages; FETF.

USPTO; Non-Final Office Action issued in U.S. Appl. No. 13/171,308; Mailed Jan. 10, 2012; 19 Pages; FETF.

USPTO; Final Office Action issued in U.S. Appl. No. 13/171,308; Mailed Mar. 28, 2013; 10 Pages; FETF.

USPTO; Notice of Allowance issued in U.S. Appl. No. 13/171,308; Mailed Jun. 6, 2013; 6 Pages; FETF.

USPTO; Notice of Allowance issued in U.S. Appl. No. 13/171,308; Mailed Sep. 12, 2013; 9 Pages; FETF.

* cited by examiner

METHOD AND APPARTUS FOR USE IN REMOTE DIAGNOSTICS

CROSS-REFERENCE TO RELATED APPLICATION

This application is a continuation of application Ser. No. 13/171,308, filed Jun. 28, 2011, by Courtney Konopka et al., entitled METHOD AND APPARATUS FOR USE IN REMOTE DIAGNOSTICS, which is a continuation of application Ser. No. 11/935,218, filed Nov. 5, 2007, by Courtney Konopka et al., entitled METHOD AND APPARATUS FOR USE IN REMOTE DIAGNOSTICS, now U.S. Pat. No. 7,984,121, which is a continuation of application Ser. No. 10/678,046, filed Oct. 1, 2003, by Courtney Konopka et al., entitled METHOD AND APPARATUS FOR USE IN REMOTE DIAGNOSTICS, now U.S. Pat. No. 7,308,492, which claims priority under 35 U.S.C. 119(e) to U.S. Provisional Patent Application No. 60/415,863, filed Oct. 2, 2002, by Courtney Konopka, entitled PROPOSED PHASE II NETMD DOCTOR ARCHITECTURE, all of which are incorporated herein by reference in their entireties.

BACKGROUND OF THE INVENTION

1. Field of the Invention

The present invention relates generally to the secure, remote diagnosis, maintenance and/or control of hardware and/or firmware of electronic devices, and in particular to electronic devices which may be accessed through a network, either directly, or by means of an intermediary host personal computer.

2. Discussion of Related Art

The complexity of electronic devices has increased dramatically to provide any number of functions, options and capabilities. As the complexity of these devices increase, so to does their operation and diagnosis. Often, malfunctions are not caused by a broken device, but rather by their incorrect operation. This increased device complexity complicates diagnosis, as well as and increases the commensurate costs of customer service.

Further, many electronic devices take advantage of the vast amounts of data and functionality available through the Internet. Such devices regularly receive content, updates and/or upgrades. For example, portable music and other media players can retrieve data for subsequent playback, or may download firmware upgrades to improve or extend device functionality functionality. Accessing and retrieving this data can be time consuming and/or complicated for some users.

The present invention advantageously addresses the above and other needs.

SUMMARY OF THE INVENTION

The present invention advantageously addresses the needs above as well as other needs by providing an apparatus, system and method for use in remotely diagnosing electronic devices and/or providing content. In one embodiment, a method for use in remotely diagnosing an electronic device includes initiating a diagnostic analysis of an electronic device, identifying the electronic device and receiving a plurality of scripts, which can in some instance be encrypted, for diagnosing the electronic device communicated over a distributed network. A first diagnostic instruction is remotely initiated with at least one of the plurality of scripts. A response is received based on the first diagnostic instruction, a second diagnostic instruction is determined based on the response with at least one of the plurality of scripts and the second diagnostic instruction is remotely initiated with at least one of the plurality of scripts. In some instances, the receiving of the plurality of scripts includes receiving at least one web page having the plurality of scripts. The method can further include the decrypting of at least a portion of the plurality of scripts prior to the initiating of the first diagnostic instruction.

The present invention can provide a system for use in remotely diagnosing electronic devices, that includes a script generator coupled with a distributed network, wherein the script generator is configured to compile at least one script and forward that at least one script over the distributed network, and a remote diagnostic controller coupled with the distributed network and with an electronic device to be diagnosed, wherein the diagnostic controller is configured to receive the at least one script and parse the at least one script such that the remote diagnostic controller forwards a first instruction to the electronic device to be performed by the electronic device, the remote diagnostic controller is further configured to receive a first reply from the electronic device and to forward a second and/or subsequent instructions to the electronic device based on the first reply. The diagnostic controller can be maintained within a host computer, wherein the host computer provides processing capabilities for the diagnostic controller in determining the second and/or subsequent instructions. Alternatively, the diagnostic controller can be maintained within the electronic device, wherein the electronic device provides processing capabilities for the diagnostic controller in determining the second instruction.

In another embodiment, the system for use in remotely diagnosing an electronic device, includes means for initiating a diagnostic analysis of an electronic device; means for identifying the electronic device; means for receiving a plurality of scripts for diagnosing the electronic device communicated over a distributed network; means for remotely initiating a first diagnostic instruction with at least one of the plurality of scripts; means for receiving a response based on the first diagnostic instruction; means for determining a second diagnostic instruction based on the response with at least one of the plurality of scripts; and means for remotely initiating the second diagnostic instruction with at least one of the plurality of scripts.

A better understanding of the features and advantages of the present invention will be obtained by reference to the following detailed description of the invention and accompanying drawings, which set forth illustrative embodiments in which the principles of the invention arc utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The present invention provides an apparatus, system and method for providing remote diagnostics of electronic devices, such as consumer-electronic devices. In some embodiments, the present invention utilizes a distributed network, such as the Internet, to achieve this remote diagnosis. Customer support is an increasingly expensive component of the cost of production. The present invention minimizes the cost of providing customer support by providing a secure and automated device diagnosis system and process. In some embodiments, the device diagnosis is achieved over a distributed network, intranet, the Internet or other distributed network. This trend of increasing cost for providing customer support demonstrates some of the benefits provided by the present invention that can determine, for example, whether a customer-reported malfunction is in fact due to a defect in the product, or merely the result of a misunderstanding on the part of the operator.

In some embodiments, the remote troubleshooting system and procedure of the present invention is configured to interact directly with a remote device to be analyzed or diagnosed in order to minimize misunderstandings between a troubleshooter (e.g., customer support technician) and a frustrated customer. This results in minimizing the need for an expensive human trouble-shooting technician. Further, the present invention can be operated over the Internet or other networks, and is thus, substantially always available and/or accessible by customers/users. Still further, the present invention can be responsive in order to overcome time lags associated with applications operated over the Internet, providing faster responses for customers/users. Additionally, the present invention is configured to be easily modified in order to reflect new devices, troubleshooting knowledge, upgrades to firmware, documentation, and other such modifications. In some embodiments, it is desirable that the invention provides secure communication during diagnosis, upgrades, modifications and other interactions to address the device errors and/or problems. Providing secure communications minimizes the opportunity for a malicious user to defeat secure aspects of the device being analyzed, or to pose as the server in order to maliciously alter aspects of a user's system or device.

Figure 1:
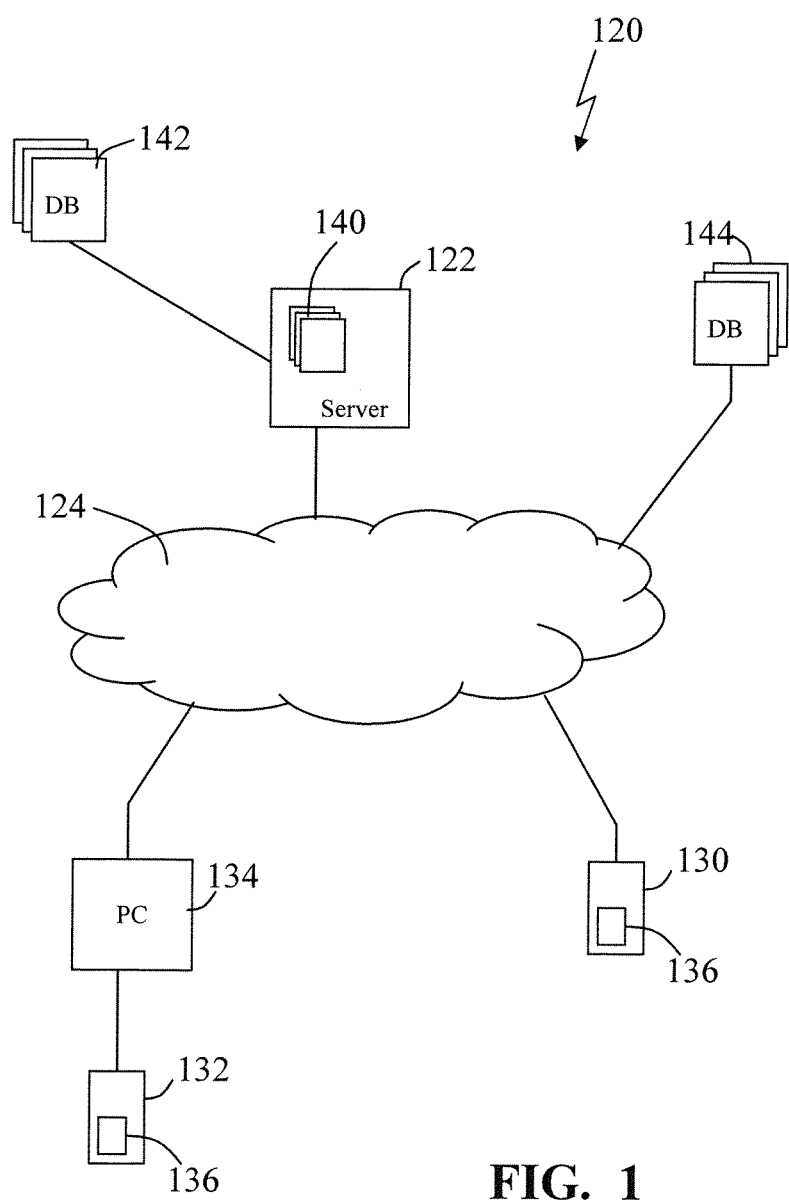
FIG. 1 depicts a simplified block diagram of a remote diagnostic system according to one embodiment of the present invention.

FIG. 1 depicts a simplified block diagram of a remote diagnostic system 120 according to one embodiment of the present invention. The system includes a diagnosing device 122, typically implemented through a server, computer or other processor. The diagnosing server 122 is coupled with a network 124, such as an intranet, the Internet and other distributed networks or combinations of networks. The server communicates with one or more remote electronic devices 130, 132 that are to be diagnosed. The devices can be substantially any electronic device, such as computers, personal computers (PC), personal digital assistants (PDA), stereos, DVD players, video cassette recorders (VCR), compact disc (CD) players, portable CD players, mini-disc players, electronic game devices (e.g., PlayStation®, GameBoy® and/or other gaming devices), set-to-boxes (STB), cellular phones, and substantially any other electronic device.

The devices 130, 132 to be diagnosed typically have at least a minimum built-in or self diagnostic capability 136 and a means of externally accessing this capability (e.g., by means of USB or some other connectivity). Further, the devices 130, 132 are configured to connect with the network 124, either directly, or through a local host device 134, such as a personal computer (PC), personal digital assistant or other host device in order to have at least intermittent access to the host server 122. The devices 130, 132 and/or the local host device 134 additionally include one or more applications to initiate access to the server 122, or to access and store one or more applications to initiate access to the server 122. The host server 122 includes one or more databases 140, couples with one or more local databases 142 and/or couples with one or more remote databases 144. The databases provide the knowledge base for the diagnostic capabilities of the present invention.

Figure 2:
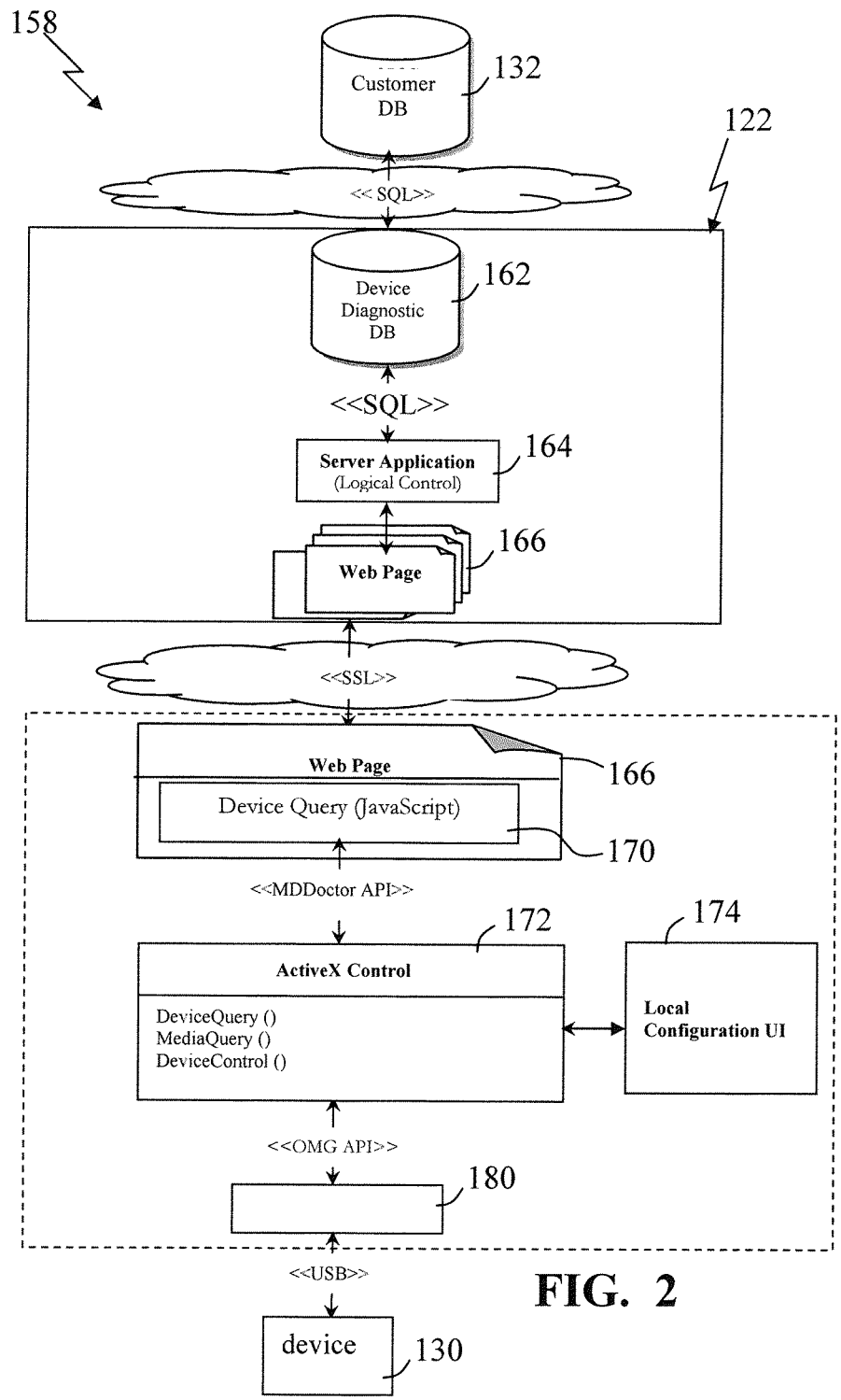
FIG. 2 depicts a simplified block diagram of a system level architecture according to one embodiment of the present invention allowing diagnostics to be performed on a remote device.

FIG. 2 depicts a simplified block diagram of a system level architecture 158 according to one embodiment of the present invention allowing diagnostics to be performed on a remote device 130. Referring to FIGS. 1 and 2, in one embodiment, the server application 164 within the server 122 is configured with the control logic to control communication with as well as diagnostic analysis of the device 130. The server application accesses a first database 162 and/or a second database 160. In some embodiments, the server application utilizes the first database to remotely access the second database 160. For example, server application can access the remote database 160 using SQL queries. The second database 160 can also serve as a repository for customer information such as remote diagnostic activity, customer habits, preferences as well as remote device health and usage statistics over time.

The server application 164 accesses the database 162 to determine appropriate responses for user or device queries, and remotely accesses the device for control, status and/or diagnostic information. The database 162 can contain up-to-date customer service, diagnostic and/or trouble-shooting information about the device being diagnosed. The database 162 can additionally include customer, diagnostic and/or trouble-shooting information for other devices, or alternate databases can be accessed for other devices. The server application can query the database looking for scripts, instructions, information and/or other data that can be used to diagnose, query and analyze the electronic device. For example, the server can utilize key words for searching such as "spindle" and "speed", or "lid open". The replies to queries received from the database(s) can be translated into executable queries (e.g., Java scripts, visual basic scripts, and the like) that can be forwarded to the electronic device.

Based on user input (through the device 130 or local host device 134) and/or information from the device, the server application 164 utilizes the database 162 to determine and forward appropriate communications 166, which can include information, instructions and/or requests, to the user and/or device. Typically, the server application includes an analysis system that receives the status information, analyzes the information and determines appropriate actions based on the status information and information received from the databases 162 and 160. In one embodiment, the server forwards communications as Internet web pages 166 to the user and/or device on the client side, as determined by user input and device status. In many instances, the web pages contain simple scripts or executable 170, such as JavaScript code, that accesses the device as directed by the server application 164, and returns desired device status information to the server application. In some embodiments, the communications 166 are achieved with TCP-IP socket protocol through the Secure Socket Layer (SSL) protocol. The web pages serve as a user interface, and as a conduit for device query requests submitted by the server application 164 through a diagnostic controller 172.

The web pages 166 and/or scripts 170 are received by the device 130 or a local host device 134 configured to interface and communicate with the device. The device or local host device 134 includes the diagnostic controller 172. The diagnostic controller retrieves device status information from the device 130 through an interface 180, such as an application program interface (API), and/or from a user through a user interface 174. In one embodiment, the diagnostic controller 172 is implemented through an ActiveX control. However, the controller 172 can be implemented through substantially any other control procedures. In one embodiment, the ActiveX control contains a secure JavaScript interpreter. In some embodiments, the diagnostic controller 172 is implemented through a local host device 134. Alternatively, the diagnostic controller 172 can be implemented through or on the electronic device 130.

The diagnostic controller 172 implements the scripts 170 forwarded in the web pages 166. For example, the controller 172 can communicate with the device 130 to request device status information (e.g., DeviceQuery ( )), such as status of a lid or door (open or closed), a battery level, memory capacity and other such device statistics. When diagnosing devices that utilize and/or play media devices (e.g., CDs, mini-discs, DVDs, and other media), the controller can communicate with the device to request media statistics (e.g., MediaQuery ( )), such as media format, number of tracks on the media, play time and other similar media statistics. Additionally, in some embodiments, the controller can communicate with the device 130 to instruct the device to perform operational functions (e.g., DeviceControl ( )), such as play a certain track on a media disc, access a desired location on a disc, dial a certain phone number (in the case where the device 130 is a phone) and other operations.

The status information is forwarded through web sites 166 to the server application 164, where the server application utilizes the status information to determine further actions and to further access the local and/or remote databases 162, 160. In accessing the databases, the server application receives additional information based on the status information received from the device or user. The server application 164 utilizes the additional information in the analysis system to determine further appropriate actions, and forwards additional instructions and/or requests to the device 130 and/or user.

One of the advantages provided by the embodiment depicted in FIG. 2 is that substantially all knowledge and software maintenance is preformed on the server side. Development and maintenance is straightforward, because the required resources for performing the maintenance are accessed from the server side. In this embodiment, the only client-side component is the diagnostic control 172, which is readily downloadable, and typically would need updating less frequently. This approach additionally utilizes the SSL protocol as a secure transmission medium.

Figure 3:
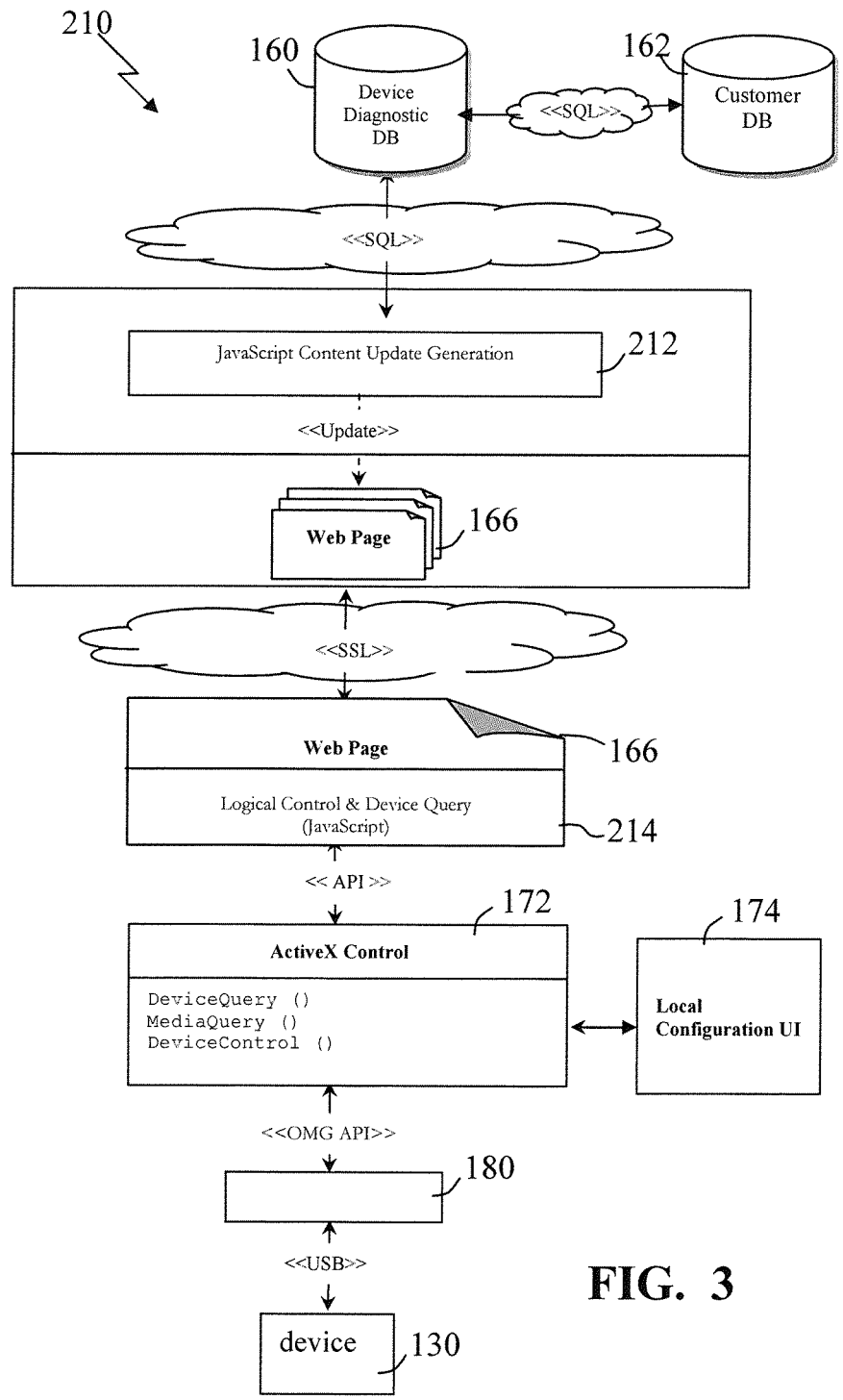
FIG. 3 depicts a simplified block diagram of a system level architecture according to an alternate embodiment of the present invention allowing remote diagnostics to be performed on a remote device.

FIG. 3 depicts a simplified block diagram of a system level architecture 210 according to an alternate embodiment of the present invention allowing remote diagnostics to be performed on a remote device 130. In this embodiment, most of the server-side resource requirements and the database and transmission lag of the architecture of FIG. 2 are significantly reduced, and preferably substantially eliminated. This is accomplished by moving the logical control functionality to a logical diagnosis controller 214 that utilizes script coding (e.g., JavaScript coding) embedded in web pages 166. This coding locally handles relevant device and/or user selection events from the device itself or a local host device 134. This coding uses knowledge pre-extracted from the remote and/or local databases 162, 160, and makes direct calls to application interface control, thereby substantially eliminating the transmission, server, and query lag. The local logical diagnosis controller 214 uses the status and/or data returned by the device or user to determine the next web page to load, thereby eliminating the server resource overhead.

The system level architecture 210 includes a script generator 212. The script generator is a process or application that extracts relevant new material from the remote database 160 and translates it into executable script, such as JavaScript or the like, for use in web pages 166. The script generator 212 provides at least two main functions. First, the script generator substantially eliminates the need for online queries from the server application 164 (see FIG. 2) to the remote database 160 by moving the "knowledge" from the remote data base 160 to the locally executed script to be forwarded to the device 130 or local host device 134 (see FIG. 1), making the diagnostic process much more responsive. Second, the script generator substantially eliminates the need to create and support the server application 164 (which could be complicated to implement and maintain), and replaces the application server with a relatively much smaller and easier-to-manage passages, e.g., JavaScript passages. These scripts are embedded into web pages 166 to be forwarded over a network to a logical controller 214.

The web pages 166 are a set of relevant web pages that contain the one or more expanded scripts generated through the script generator 212. The web pages 166 can be updated with one or more expanded scripts from the script generator 212 to reflect changes to the remote database. Typically, the web pages 166 are communicated through the SSL protocol. The logical controller 214 utilizes device status information to determine scripts to implement for further requests and/or instructions to be forwarded to the device 130 and/or user interface 174.

The diagnostic control 172 retrieves status and asserts control over the device 130 by executing the scripts communicated through the web pages 166 and forwarded by the logical controller 214. In forwarding the scripts, the inquiries and/or requests are performed locally, increasing the speed of results and allows for greater detailed and/or finer-grained inquiries. This in turn provides for a more responsive system 120 (see FIG. 1). Similar to the architecture 158 of FIG. 2, the architecture 210 of FIG. 3 provides for changes to the system to be executed on the server side. As described above, changes relevant to the diagnosis of the device are implemented in updated scripts generated through the script generator 212 and forwarded as updated web pages 166.

In one embodiment, the architecture of the present invention provides further protection for the device 130 from examination by malicious users or potential competitors. In one embodiment, code obfuscation scrambling is used to make it much more difficult and preferably prevent unauthorized access and/or tampering with the device or other aspects of the system and architecture. In utilizing code obfuscation the communications over the Internet 124, (e.g., HTML and JavaScript code) are "scrambled" by randomizing variable names and values, using HTML code compression, and escape sequences. A public-domain code is also available for this purpose.

Figure 4:
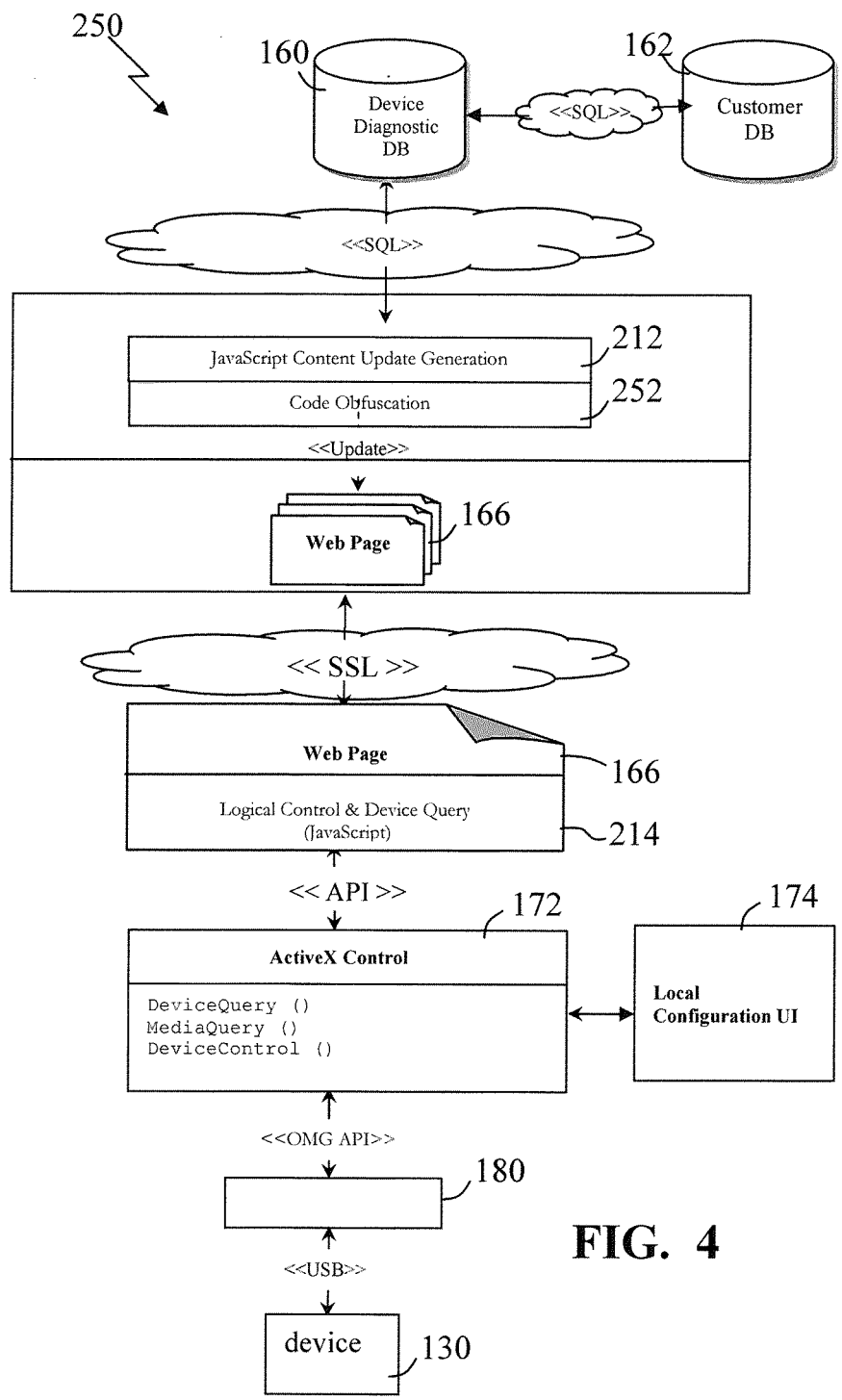
FIG. 4 depicts a simplified block diagram of a system architecture according to one embodiment of the present invention where code obfuscation is utilized to provide added security.

FIG. 4 depicts a simplified block diagram of a system architecture 250 according to one embodiment of the present invention where code obfuscation is utilized to provide added security. The system architecture 250 is similar to the system architecture 210 of FIG. 3. However, a code obfuscation scramble 252 is included to scramble the scripts generated through the script generator 212, and to scramble potentially HTML code as well. The code obfuscation scrambler 252 can be implemented through commercially available software package (e.g., Web Protectors™) or public-domain versions. Further, the diagnostic controller 172 is additionally configured to descramble the obfuscation scrambling. This approach provides a straightforward means of obtaining additional security for the diagnostic controller 172, implemented in some embodiments through an ActiveX controller.

Figure 5:
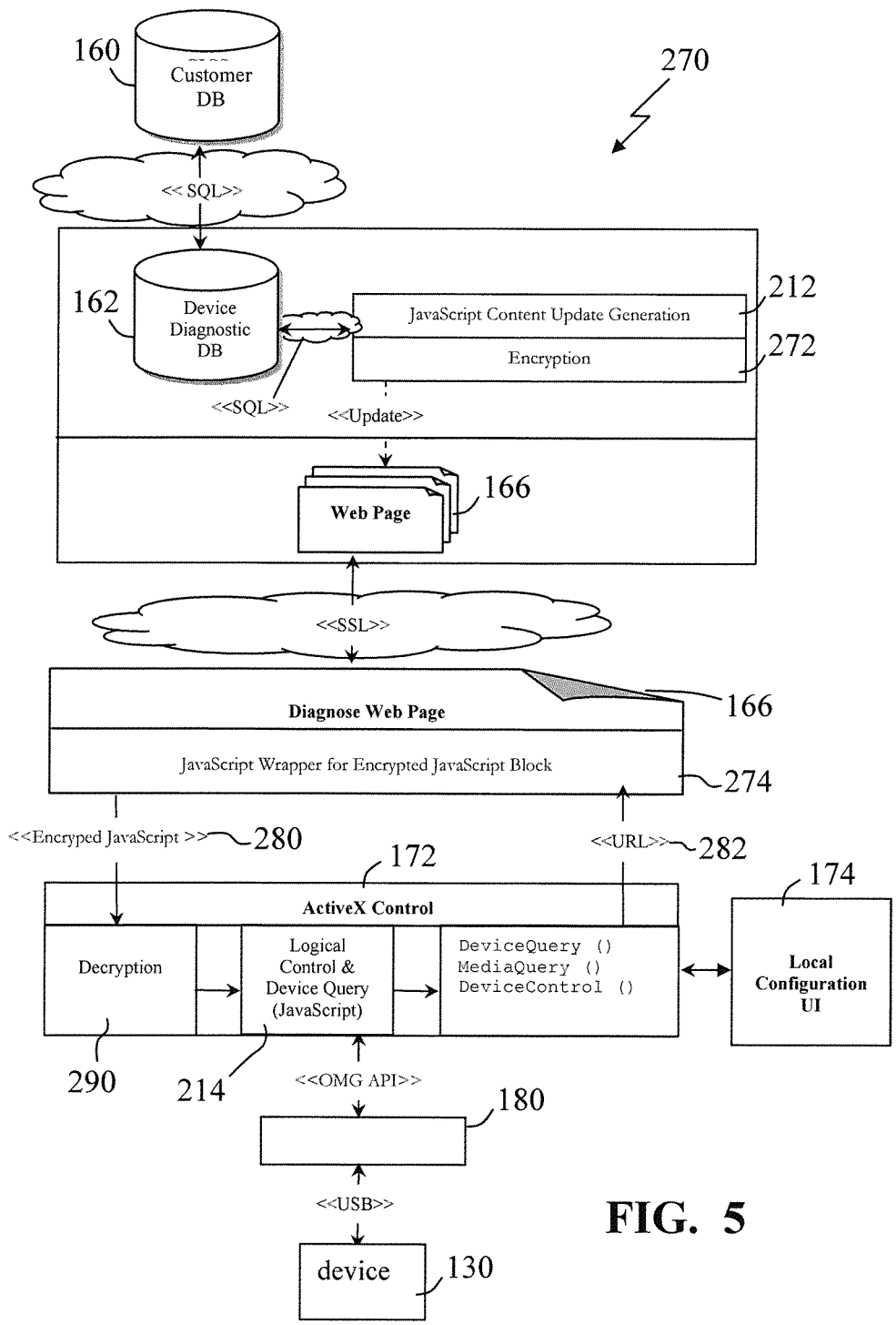
FIG. 5 depicts a simplified block diagram of a system level architecture providing encryption security according to one embodiment of the present invention.

In an alternative embodiment, the present invention can utilize encryption to provide added security. FIG. 5 depicts a simplified block diagram of a system level architecture 270 providing encryption security according to one embodiment of the present invention. The architecture is similar to that of the architecture 210 of FIG. 3; however, an encryption module 272 is provided coupled with the script generator 212. The scripts generated through the scripts generator 212, as well as other sensitive communications, are encrypted by the encryption module before being incorporated into the web pages 166. In some embodiments, the encryption is implemented using a combination of a private key known only to the encryption/decryption blocks 272 and 290, and a user-unique key supplied by a public/private encryption algorithm. This "private key" could also be used to detect code-breaking attempts.

The encrypted communications are incorporated within web pages 166 and forwarded to the device 130 or local host device 134 (see FIG. 1). The encrypted scripts are extracted from the web pages and decrypted by decryption module 290 of the diagnostic controller 172. The web pages 166 can contain a JavaScript wrapper around encrypted JavaScript that are decrypted by the decryption module 290, providing the executable scripts to be run by the logical controller 214 incorporated within the diagnostic controller 172. The decryption module utilizes, in some embodiments, a public/private decryption algorithm that decrypts the script code, with the decrypted code being forwarded to the device 130 or user interface 174.

The scripts are implemented within the diagnostic controller 172 to query the electronic device 130 or can be forwarded to the device for implementation within the device. The query and/or scripts are forwarded over an interface 180, such as an API and/or COM object interface. Alternatively, the controller 172 is implemented within the electronic device 130 such that the scripts are decrypted and implemented by the device 130. Typically, the remote diagnostic controller 172 queries the electronic device 130 by utilizing diagnostic capabilities built into the device. For example, in manufacturing of electronic devices, many electronic devices have diagnostic capabilities for setting parameters within the electronic device, such as, LED intensity, laser intensity, spindle speed and other built in capabilities.

Figure 6:
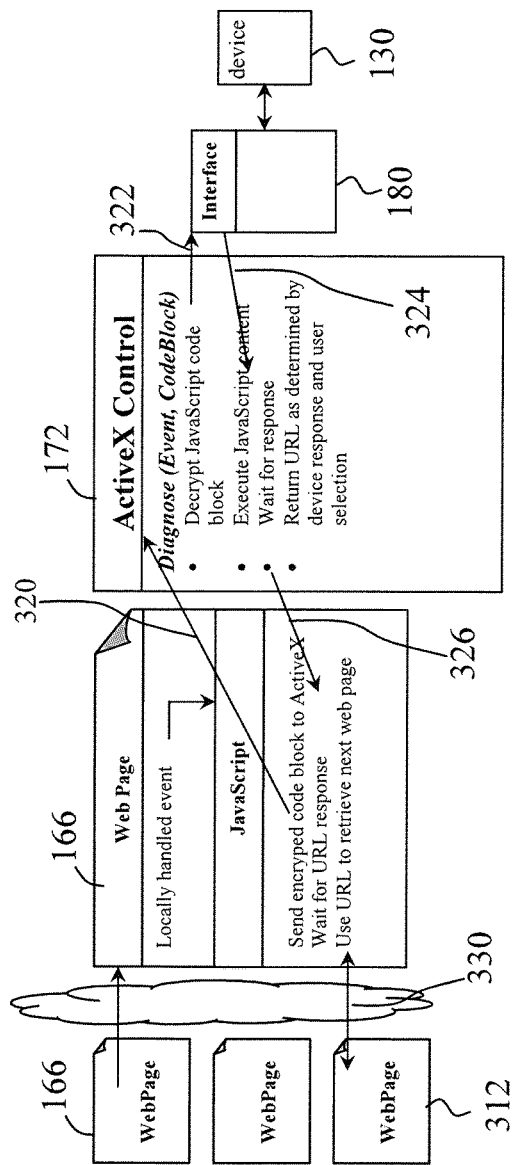
FIG. 6 depicts a simplified block diagram of an example of a logic flow of the decryption and execution of a script through the diagnostic controller of FIG. 4 and/or FIG. 5 according to one embodiment of the present invention.

FIG. 6 depicts a simplified block diagram of an example of a logic flow of the decryption and execution of a script through the diagnostic controller 172 according to one embodiment of the present invention. Encrypted "logical control" scripts are moved from the web page 166 into the diagnostic controller 172 (indicated by the arrow labeled 320. The decryption module of the controller 172 decrypts the script, and the logical controller 214 within the diagnostic controller 172 (see FIG. 5) executes the script, for example submitting a request for a device type over an interface 180 to the device 130 being diagnosed (indicated by the arrow labeled 322). The diagnostic controller 172 waits for a response, for example, a URL response (indicated by the arrow labeled 324). The diagnostic controller 172 forwards the received URL to the web page (indicated by the arrow labeled 326). The web page then returns the URL initiating the communication of one or more additional web pages 312 (indicated by the arrow labeled 330) based on the data obtained from the device in the URL.

In one embodiment, the remote diagnosis is initiated when user accesses the diagnostic system 120, for example by accessing a diagnostic webpage over the internet 124. In accessing the diagnosis system, the user and/or device is supplied with the diagnostic controller 172, if diagnostic controller has not already been forwarded to the user and/or device. For example, a web page 166 can be forwarded to the user and/or device containing code that is installed, and in some embodiments automatically installed. The diagnostic controller can subsequently be run on the device or local host device 134 (e.g., user's PC). The diagnostic controller securely executes scripts, code and/or instructions forwarded in subsequent pages. In some embodiments, the diagnostic controller 172 is implemented, at least in part through an ActiveX component that contains a secure script or JavaScript interpreter.

The device controller typically begins diagnosis by identifying the device to be diagnosed, preferably by querying the device itself. If the device query fails or does not have this capability, the device is identified by querying the user. The device ID is forwarded back to the server application 164. Using device ID, the server is referenced and returns the appropriate next page, which contains a secure block of code. In some preferred implementations, this code is written in JavaScript. This secure block is wrapped in unsecured code, whose function is to send the secure content to the previously downloaded (ActiveX or other) software component. This secure content is then unencrypted and executed. The execution of this content may consist of querying the device for its current operational status, testing of certain diagnostic statuses, or device operations, or other operations depending on the design of the application. This application interacts with the device or user (through the host) by means of the downloaded web pages. Optionally, the process may proceed by directing the user by means of one or more pages, or by requesting additional pages from the server, which may in turn contain additional secure blocks to be executed in the downloaded application, a new application, firmware updates and the like.

As one example, the present invention can be utilized to perform diagnostics on an electronic device 130 for playing music. The music device 130 can access a music source home internet page to gain access to music as well as initiate diagnostic analysis of the device. For example, the music device can receive digital music from Sony Electronics' MusiClub® internet site. The remote database 160 can contain diagnostic scripts that can be forwarded through a script generator 212 operated from the MusiClub internet site. The diagnostic controller 172 can be implemented directly within the music device 130 or within a host PC. The diagnostic controller 172 extracts, decrypts and implements the script to query the device and/or instruct the device to perform specific operations.

Figure 7:
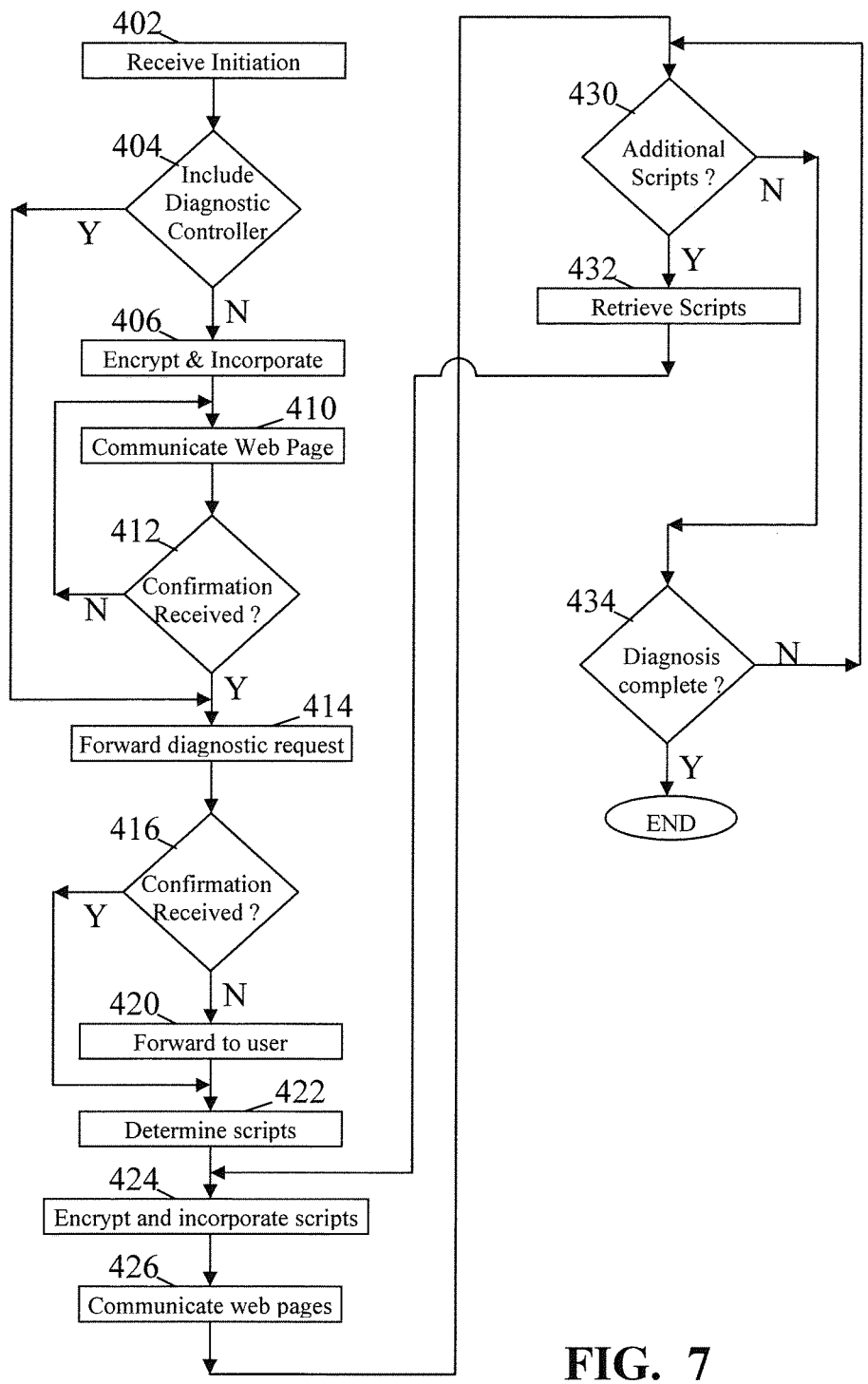
FIG. 7 depicts a simplified flow diagram of a process for supplying diagnostic scripts for the remotely diagnosing an electronic device using architectures shown in the previous figures and described above, such as the architectures shown in FIGS. 3-6.

FIG. 7 depicts a simplified flow diagram of a process 400 for supplying diagnostic scripts for remotely diagnosing an electronic device using architectures shown in the previous figures and described above, such as the architectures shown in FIGS. 3-6. The process 400 is described below with additional reference to FIG. 5. In step 402, the script generator 212 receives an initiation for the remote diagnosis of the electronic device 130. Typically, the electronic device or a host device 134 is coupled with the distributed network 124 and coupled with the script generator through the distributed network. In step 404, it is determined if the electronic device 130 includes a diagnostic controller 172 (see FIG. 5). If not, step 406 is entered where a script incorporating the diagnostic controller as well as a script to automatically load the diagnostic controller is encrypted and incorporated into a web site. In step 410, the web site is communicated over the distributed network.

In step 412, it is determined if a confirmation is received confirming the installation of the diagnostic controller. If not, the process returns to step 410 to re-communicate the script containing the diagnostic controller. In some embodiments, a counter is utilized to limit the number of times the script incorporating the diagnostic controller is communicated. If the script is communicated a predefined number of times, the process can be terminated or other means for communicating the diagnostic controller can be attempted. If a confirmation is received, the process proceeds to step 414 where a script is communicated to identify the electronic device or determine the electronic device type (e.g., Walkman™, Palm Pilot™, and other similar devices).

In step 416, the process determines if the device type is returned. If not, step 420 is entered where a request for the identity of the electronic device is forwarded to a user accessing the remote diagnostic system 270 through a host device 134 (e.g., a host PC). If, in step 416, the device type is returned, the process continues to step 422 where the device type is used to determine diagnostic scripts needed to implement the remote diagnostic analysis of the electronic device. In step 424, the needed scripts are encrypted and the encrypted scripts are incorporated into one or more web pages. In step 426, the one or more web pages are communicated over the network 124 to be received by the remote diagnostic controller 172.

In step 430, the process determines if additional scripts are needed to perform the remote diagnostic. This determination can be achieved by a request from the remote diagnostic controller, which is initiated when all needed scripts were not previously forwarded or based on the diagnosis with the previously communicated scripts. If additional scripts are needed, the process proceeds to step 432 where it is determined what additional scripts are needed and the needed scripts are retrieved. The process then returns to step 424 to encrypt the scripts for communication to the diagnostic controller. If additional scripts are not needed, step 434 is entered where it is determined if the remote diagnosis is complete. If the diagnosis is not complete, the process returns to step 430 to determine if additional scripts are needed, otherwise the process 400 terminates.

Figure 8:
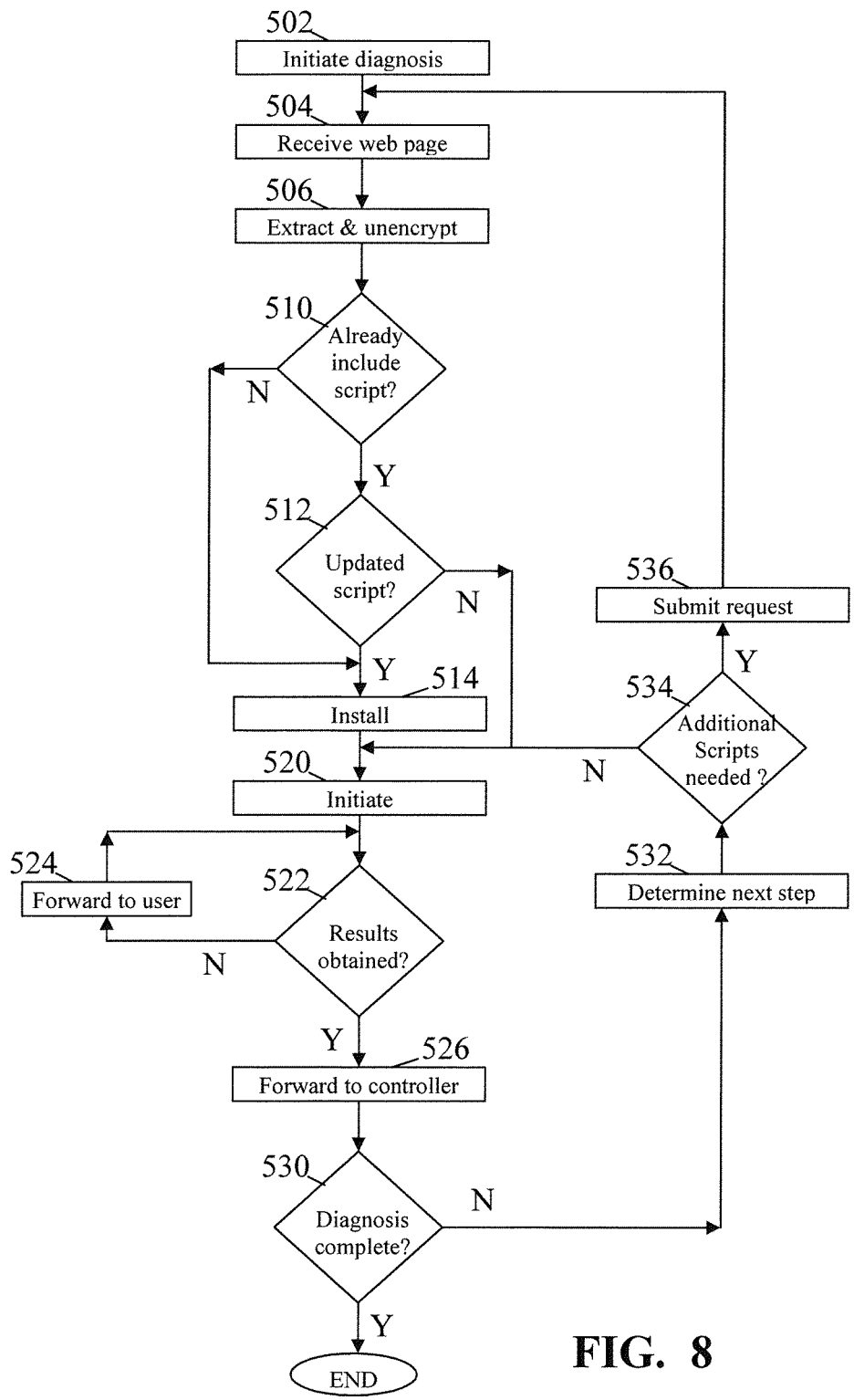
FIG. 8 depicts a simplified block diagram of a process for implementing a remote diagnosis of an electronic device using architectures shown in previous figures and described above, such as architectures shown in FIGS. 3-6.

FIG. 8 depicts a simplified block diagram of a process 500 for implementing a remote diagnosis of an electronic device using architectures shown in previous figures and described above, such as architectures shown in FIGS. 3-6. The process 500 is described in reference to FIGS. 8 and 5. In step 502, the process is initiated, typically through a user request. Alternatively and/or additionally, the process can be initiated based on a schedule (e.g., once a week, once a day, once every predefined number of operations, and the like), by a secondary device and/or secondary remote device (e.g., a companies computer system, a companies shipping computer system, a parents computer, and the like) and other secondary devices. When initiated by a user, the user request can be received directly from an electronic device 130 to be diagnosed or through a remote host device 134. Similarly, the request can be received directly or remotely from a secondary device. Typically upon initiation, the host device and/or electronic device notifies a remote server to request a diagnostic controller 172 or confirm that a diagnostic controller has previously been received.

In step 504, a first web page is received by the host device or electronic device. In step 506, one or more scripts are extracted from the web page and unencrypted if they are encrypted. In step 510, the process 500 determines if the received scripts were previously received in a previous diagnosis. If the scripts already exist, step 512 is entered where it is determined if this script is an updated script. If it is found in step 512 that it is an updated script or if in step 510 the script was not stored, step 514 is entered where the updated script is installed or stored (over the old script if an older script previously existed). The storage of the script can be in temporary memory, RAM, ROM or other memory associated with the electronic device 130 or host device 134. In step 520, one of the scripts is initiated. For example, the diagnosis controller can request the identity of the electronic device being diagnosed, verify (or forward) a license (e.g., content, access and other licenses) and/or implement maintenance and/or upgrades. As another example, a script can be employed to query an electronic device to determine current usage of the device to monitor usage habits (e.g., monitor or poll a subscriber's viewing and/or listening habits, a parent monitoring a child's usage and/or web pages accessed). Similarly, a script can query remote devices to determine an inventor or other applications, and/or to initiate operation of a remote device.

In step 522, it is determined if a result is returned from the device with information requested in the executed script and/or verification of the execution of the script. If a result is not returned, step 524 is entered where this same script request is forwarded to a user. For example, the request can be shown on a display of the electronic device or the host device. If in step 522 a result is returned, step 526 is entered where the diagnostic controller utilizes the returned results to determine further diagnostic analysis, processing and/or instructions for implementation.

In step 530, it is determined if the remote diagnosis is complete. If not, step 532 is entered where the next diagnostic step is determined Typically, this is determined through the remote diagnostic controller. In step 534 it is determined if additional scripts are needed to implement the next diagnostic step. If additional scripts are needed from the remote server, step 536 is entered where a request is entered into a web page and communicated to the remote server. If in step 534 additional scripts are not needed from the remote server, the process returns to step 520 where it initiates the next script determined. If it is determined in step 530 that the diagnosis is complete the process terminates.

As indicated above with respect to FIG. 8, the present invention can be utilized to provide an online service that remotely executes recommended viewing schedule or music downloads to individual devices, such as personal audio devices. Further, the present invention can implement remote queries as to the current usage of electronic devices. This could be used to automatically poll a subscriber's viewing or listening habits, or for a parent to check on a child's current viewing. Additionally, the present invention can provide automated remote maintenance of connected electronic devices and/or automated remote upgrades of connected devices. Remote checking of content licenses (e.g. enforcement of digital rights management) can also be implemented through the diagnostic architectures of the present invention, or to remotely locate connected devices for inventory or other purposes. The architectures of the present invention can also be applied to remotely and securely operate connected devices in substantially any pre-programmed and/or interactive manner.

While the invention herein disclosed has been described by means of specific embodiments and applications thereof, numerous modifications and variations could be made thereto by those skilled in the art without departing from the scope of the invention set forth in the claims.

What is claimed is:

1. A system for use in remotely diagnosing electronic devices, comprising:
   a remote diagnostic controller incorporated within an electronic device to be diagnosed and coupled with a distributed network;
   the remote diagnostic controller configured to: receive from over the distributed network one or more web pages from a remote script generator wherein at least one of the web pages comprises at least one script, determine whether the at least one script was previously received, store the at least one script when determined that the at least one script was not previously received, determine whether the at least one script was previously received is an updated script of at least one script previously received, store the at least one script when the at least one script is an updated script of at least one script previously received, implement the at least one script such that the remote diagnostic controller identifies a first diagnostic instruction and causes the electronic device to perform the first diagnostic instruction, determine results from implementing the first diagnostic instruction, determine at least a second diagnostic instruction based on the results from implementing the first diagnostic instruction, and cause the electronic device to perform at least the second diagnostic instruction.

2. The system of claim 1, wherein the remote diagnostic controller is further configured to determine whether one or more additional scripts are needed to implement the second diagnostic instruction, and to request from over the distributed network at least a second script configured to allow an implementation of the second diagnostic instruction when the remote diagnostic controller determines that one or more additional scripts are needed.

3. The system of claim 2, further comprising:
   the script generator coupled with the distributed network, where the script generator is configured to compile the at least one script, incorporate the at least one script into a web page and forward the web page with the at least one script over the distributed network to the diagnostic controller.

4. The system of claim 1, wherein the remote diagnostic controller is further configured to analyze the results to implementing the first diagnostic instruction and determine whether one or more further diagnostic instructions are needed, and identify at least the second diagnostic instruction when the one or more further diagnostic instructions are needed.

5. A system for use in remotely diagnosing electronic devices, comprising:
   a remote diagnostic controller incorporated within an electronic device to be diagnosed and coupled with a distributed network;
   the remote diagnostic controller configured to: receive from over the distributed network one or more web pages from a remote script generator wherein at least one of the web pages comprises at least one script, implement the at least one script such that the remote diagnostic controller identifies a first diagnostic instruction and causes the electronic device to perform the first diagnostic instruction, determine results from implementing the first diagnostic instruction, determine at least a second diagnostic instruction based on the results from implementing the first diagnostic instruction, and cause the electronic device to perform at least the second diagnostic instruction;
   wherein the remote diagnostic controller is further configured to:
   receive a first plurality of scripts in the one or more web pages;
   determine whether at least one of the first plurality of scripts was previously received;
   store those scripts that were not previously received;
   determine whether one or more of the first plurality of scripts determined to have been previously received are updated scripts of one or more scripts previously received; and
   store the one or more updated scripts when the one or more updated scripts are updated scripts of the one or more previously received scripts.

6. The system of claim 1, wherein the remote diagnostic controller is further configured to:
   receiving within the diagnostic controller an identification of the electronic device;
   determine within the diagnostic controller a second script needed to implement the diagnosis of the electronic device in response to receiving the identification of the electronic device; and
   receive the second script from over the distributed network.

7. A system for use in remotely diagnosing electronic devices, comprising:
   a remote diagnostic controller incorporated within a host computer coupled with a distributed network and in communication over the distributed network with an electronic device to be diagnosed;
   the remote diagnostic controller configured to receive from over the distributed network one or more web pages from a remote script generator where at least one of the web pages comprises at least one script, determine whether the at least one script was previously received, store the at least one script when determined that the at least one script was not previously received, determine whether the at least one script was previously received is an updated script of at least one script previously received, store the at least one script when the at least one script is an updated script of at least one script previously received, implement the at least one script such that the remote diagnostic controller forwards a first diagnostic instruction to the electronic device to be performed by the electronic device, to receive a first reply from the electronic device, to determine at least a second diagnostic instruction based on the first reply and to forward at least the second diagnostic instruction to the electronic device, wherein the host computer provides processing capabilities for the diagnostic controller in determining the second diagnostic instruction.

\* \* \* \* \*

UNITED STATES PATENT AND TRADEMARK OFFICE
CERTIFICATE OF CORRECTION

PATENT NO. : 8,880,675 B2
APPLICATION NO. : 14/012914
DATED : November 4, 2014
INVENTOR(S) : Konopka et al.

It is certified that error appears in the above-identified patent and that said Letters Patent is hereby corrected as shown below:

On the Title Page and in the Specification:
Column 1, line 1, Title, delete "APPARTUS" and insert --APPARATUS--.

Signed and Sealed this
Twenty-first Day of April, 2015

Michelle K. Lee
*Director of the United States Patent and Trademark Office*